(12) United States Patent
Smith et al.

(10) Patent No.: US 6,579,485 B2
(45) Date of Patent: Jun. 17, 2003

(54) METHOD OF INJECTION MOLDING AROUND THE SURFACE OF AN OBJECT

(75) Inventors: Keith A. Smith, Burlington (CA); Steve B. Levay, Font Hill (CA)

(73) Assignee: Haun Drop Forge Co. Ltd., Welland (CA)

(*) Notice: Subject to any disclaimer, the term of this patent is extended or adjusted under 35 U.S.C. 154(b) by 111 days.

(21) Appl. No.: 09/736,436

(22) Filed: Dec. 15, 2000

(65) Prior Publication Data

US 2002/0074688 A1 Jun. 20, 2002

(51) Int. Cl.[7] .................. B29C 45/14; B29C 45/16; B29C 70/70; B29C 70/74
(52) U.S. Cl. .................. 264/247; 264/255; 264/267; 264/273; 264/274; 264/275; 264/278
(58) Field of Search .................. 264/245, 246, 264/247, 250, 254, 255, 259, 273, 274, 275, 278, 279, 279.1, 267, 328.8; 425/121, 125, 126.1, 129.1; 24/198, 197, 265 EE, 303; 70/278.3

(56) References Cited

U.S. PATENT DOCUMENTS

| | | | | |
|---|---|---|---|---|
| 2,663,910 A | * | 12/1953 | Danielson et al. | 264/247 |
| 3,549,477 A | * | 12/1970 | Burgman | 156/245 |
| 4,203,941 A | * | 5/1980 | Brooker | 264/250 |
| 4,495,130 A | * | 1/1985 | Hedrick | 264/254 |
| 4,876,915 A | * | 10/1989 | Iuchi | 264/250 |
| 5,527,502 A | * | 6/1996 | Kiuchi et al. | 264/250 |
| 5,882,567 A | * | 3/1999 | Cavallaro et al. | 264/250 |
| 6,183,681 B1 | * | 2/2001 | Sullivan et al. | 264/245 |
| 6,195,849 B1 | * | 3/2001 | Smith et al. | 24/197 |
| 6,264,869 B1 | * | 7/2001 | Notarpietro et al. | 264/247 |

* cited by examiner

Primary Examiner—Angela Ortiz
(74) Attorney, Agent, or Firm—Merek, Blackmon & Voorhees, LLC

(57) ABSTRACT

A method of injection molding material around the surface of an object. The method involves positioning the object within the cavity of a first mold and holding the object through the use of a plurality of clamping mechanisms. Material is injection molded about the surface of the object such that the material encompasses the object's surface except for points of contact between the clamping mechanisms and the object. A plurality of protrusions, formed of injection molded material and extending outwardly from the surface of the object, are formed during the injection molding process. Thereafter the object is removed from the first mold cavity and positioned within the cavity of a second mold. The object is secured within the second mold cavity through engagement of the outwardly extending protrusions with the second mold. Additional material is then injection molded about the surface of the object with the additional material encompassing the object except for points of contact between the outwardly extending protrusions and the second mold.

15 Claims, 3 Drawing Sheets

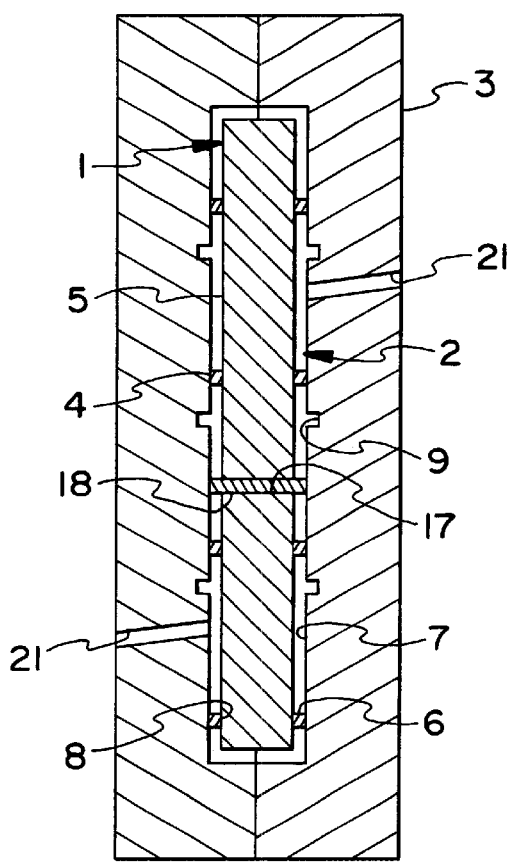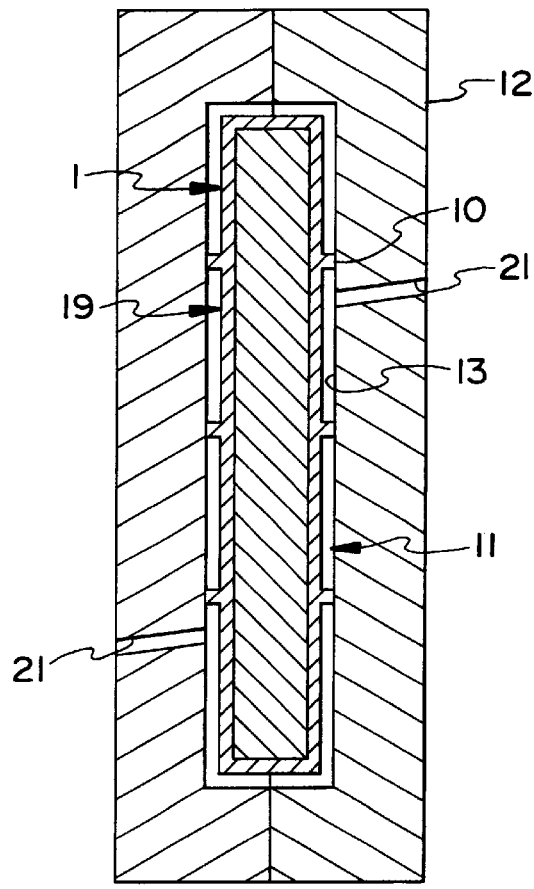
FIG. 6         FIG. 7

METHOD OF INJECTION MOLDING AROUND THE SURFACE OF AN OBJECT

FIELD OF THE INVENTION

This invention relates to a method of injection molding about the surface of an object, and in particular to a two stage method that helps to ensure an approximately even coverage of injection molded material about the object.

BACKGROUND OF THE INVENTION

Injection molding is a commonly used method of manufacturing a large number of different parts and devices made from plastic, nylon or other injection moldable materials. Injection molded products are typically manufactured quickly and at a relatively low cost, and often result in a finished product with a smooth, non-abrasive and corrosion resistant finish. Various different surface configurations are also readily formed through injection molding. Unfortunately, a significant limitation of injection molded products is their tendency to exhibit a low inherent tensile and compressive strength. Typically injection molded products formed from plastic, nylons or other materials have significantly lower tensile and compressive strengths than similar products made from metal.

In order to create a product having many of the benefits and attractiveness of an injection molded product, but at the same time having the inherent strength of a metallic product, others have made attempts to injection mold over metallic and similar objects. Unfortunately, existing molding techniques have proven to be somewhat less than ideal with the finished product often having an uneven coating of injection molded material about its outer surface. Such difficulty most often stems from the inability to accurately hold an object within a mold cavity prior to injection molding so as to ensure even coverage. With an injection molded covering material unevenly dispersed over the surface of the object, there exists the potential for the covering to more readily become detached thereby exposing the underlying metal or other substrate. Such an event can lead to premature wear of the underlying object and corrosion problems. In cases where the injection molding covering is used for electrical insulation, a loss or thinning of the covering can result in the product becoming conductive, and potentially dangerous.

SUMMARY OF THE INVENTION

The invention therefore provides a method of injection molding around the surface of an object that addresses a number of the limitations of pre-existing methods currently in use. In particular, in one preferred embodiment the method according to the present invention provides a means to injection mold material about the surface of an object through a two-stage process that helps to ensure a substantially even coverage of material about the surface of the object.

Accordingly, in one of its aspects the invention provides a method of injection molding material around the surface of an object, the method comprising the steps of: positioning the object within the cavity of a first mold, said object held within said mold cavity through the use of a plurality of clamping mechanisms that contact the surface of said object; injection molding material about the surface of said object, said material encompassing the surface of said object except for the points of contact between said clamping mechanisms and said object, said step of injection molding material about the surface of said object including the formation of a plurality of protrusions extending outwardly from the surface of said object, said protrusions formed of said injection molded material; allowing said injection molded material to at least partially solidify about the surface of said object; removing said object with said injection molded material about its surface from said first mold cavity and positioning said object within the cavity of a second mold; securing said object within said second mold cavity through engagement of said plurality of outwardly extending protrusions with the interior surface of said second mold; and injection molding additional material about the surface of said object, said additional material encompassing said object and said at least partially solidified material except for points of contact between said outwardly extending protrusions and the interior surface of said second mold.

Further aspects and advantages of the invention will become apparent from the following description taken together with the accompanying drawings.

BRIEF DESCRIPTION OF THE DRAWINGS

For a better understanding of the present invention, and to show more clearly how it may be carried into effect, reference will now be made, by way of example, to the accompanying drawings which show the preferred embodiments of the present invention in which:

FIG. 6 is a side sectional view of a first mold having the D-ring of FIG. 1 received therein; and, FIG. 7 is a side sectional view of a second mold having the D-ring of FIG. 2 received therein.

DESCRIPTION OF THE PREFERRED EMBODIMENT

The present invention may be embodied in a number of different forms. However, the specification and drawings that follow describe and disclose only some of the specific forms of the invention and are not intended to limit the scope of the invention as defined in the claims that follow herein.

Figure 1:
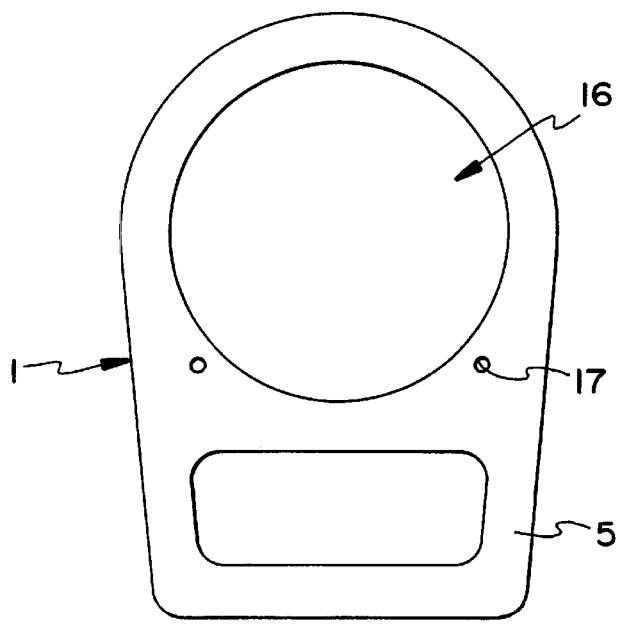
FIG. 1 is a side plan view of a D-ring over which material is to be injection molded pursuant to the method of the present invention.

FIG. 1 shows a relatively standard D-ring, commonly used in the construction and other industries. For purposes of illustration only, the inventive method of the present application will be described in association with the D-ring 1 shown in FIG. 1. However, it will be readily appreciated by those skilled in the art that the described method can equally be applied to a very wide variety of different objects having an equally wide variety of uses and applications.

In FIG. 1, D-ring 1 is shown as being a relatively thin blank that would typically be comprised of a metallic substance in order to provide it with a relatively high degree of inherent tensile and compressive strength. For applications where high levels of strength are not required, or where the necessary strength to weight ratio dictates that steel or other metallic substances are undesirable, D-ring 1 may be comprised of a variety of other materials including fiberglass and carbon or graphite polymers. Where D-ring 1 is metallic, it would most often be formed through a standard metal stamping process, although in other instances it could be a cast or forged product.

According to the present method, D-ring 1 is first positioned within the cavity 2 of a first mold 3 (see FIG. 6). The D-ring is held within cavity 2 through the use of a plurality of clamping mechanisms 4 that contact the outer surface 5 of the D-ring. In the preferred embodiment, clamping mechanisms 4 are comprised of a plurality of rigid pins 6 that are attached to the interior surface 7 of mold 3. The outermost ends 8 of pins 6 are preferably smooth and at right angles to the longitudinal axes of the pins such that when D-ring 1 is received within cavity 2, the two halves of the mold may be received around the D-ring with the outer ends 8 of pins 6 pressed up against the outer surface 5 of the D-ring to help securely hold the D-ring within mold cavity 2 (see FIG. 6). As will also be apparent from an examination of FIG. 6 to ensure an approximately even coverage of injection molded material 19 about the exterior surface of D-ring 1 in the preferred embodiment pins 6 are generally of a length such that the set-off of the D-ring from the interior surface 7 of the mold is approximately equal around the entire D-ring.

To further insist in the stabilization of the D-ring within cavity 2, preferably pins 6 on one side of mold 3 are in general alignment with pins on the opposite side of the mold. In this manner, when the mold is secured about the D-ring, pins 6 will contact the outer surface of the D-ring on opposite sides thereof, to help limit or prevent the imposition of torque, or a tendency of the ring to twist when compressed through interaction with pins 6.

It will then be appreciated that pins 6 serve the dual function of helping to ensure a more even coverage of injection molded material about the exterior surface of D-ring 1 and serve as a means to hold the D-ring in place during the injection molding process. Typically injection molded material is delivered into a mold cavity via ducts 21 and under a relatively high pressure to ensure that all voids within the mold cavity are completely filled. Without the employment of a mechanism to securely hold the D-ring securely within the mold cavity, pressurized injection molded material will have a tendency of causing the D-ring or object within the cavity to be displaced. In such cases coverage of the injected material about the surface of the object may be incomplete or of a non-uniform thickness. Through a proper sizing of the length of pins 6 relative to the thickness and dimensions of D-ring 1, sufficient compression can be established between pins 6 and the exterior surface of the D-ring to ensure that the D-ring is held within the cavity with adequate force to prevent it from being displaced upon the entry of pressurized injection molded material into the mold cavity.

It will be appreciated and understood that in the example of the invention as described herein, where material is sought to be injection molded about the surface of a metallic D-ring, the D-ring blank is a generally planar object of relatively uniform thickness such that pins 6 will all preferably be of the same approximate length. However, when injection molding about the surface of an object of non-uniform thickness, the length of pins 6 may vary according to the exterior dimensions of the object, the interior configuration of the mold cavity, and the desire for an increased or decreased thickness of injection molded material about certain portions of the object's surface. To accommodate objects that may have a varying exterior profile, in one embodiment of the invention pins 6 may be constructed such that they are extendable and retractable within the mold cavity. Retractable pins may also provide the added benefit of assisting in the release of the object from the mold after material has been injection molded about its surface.

In a preferred embodiment of the present invention, first mold 3 may be constructed such that it provides for the formation of a plurality of protrusions of injection molded material extending outwardly from the surface of D-ring 1. To accomplish this the interior surface of mold cavity 3 may have a series of blind end bores 9 that open into the mold cavity and thereby allow for receipt of injection molded material therein. That is, when material is injection molded about the exterior surface of the D-ring, such material is also forced into bores 9 resulting in the formation of outwardly extending protrusions 10 upon the solidification of the injection molded material. In most instances it is expected that bores 9 and protrusions 10 will be generally perpendicular to the exterior surface of D-ring 1. Further, as in the case of pins 6, bores 8 are preferably diametrically opposed such that protrusions 10 are formed in pairs on opposite sides of the exterior surface of D-ring 1.

Figure 2:
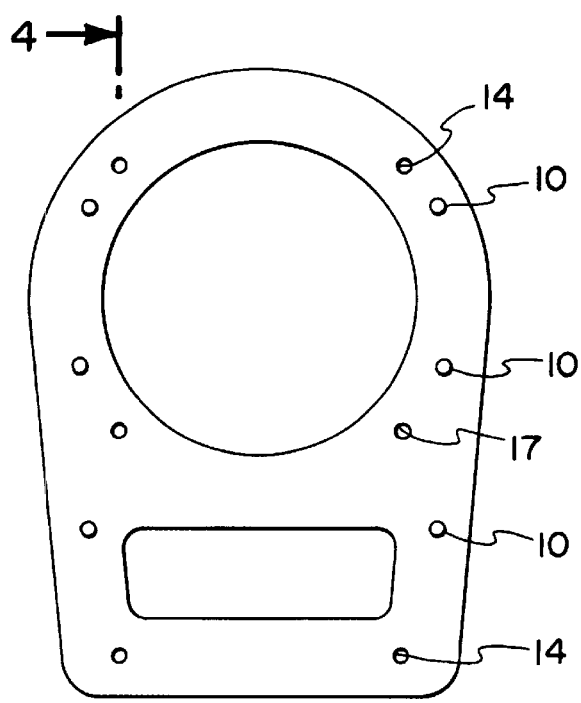
FIG. 2 is a side plan view of the D-ring shown in FIG. 1 following an initial application of injection molded material over its surface.
Figure 3:
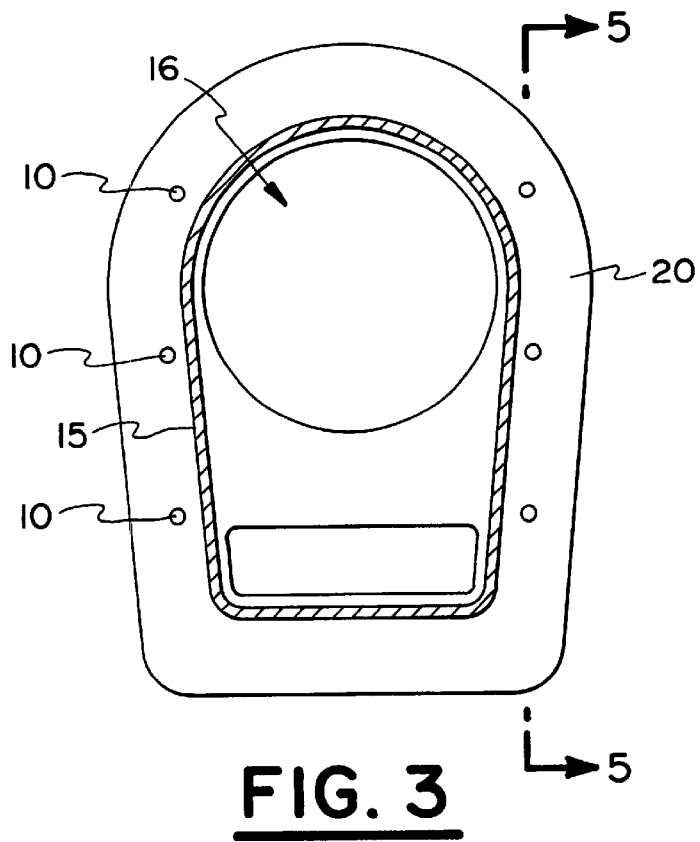
FIG. 3 is a side plan view of the D-ring having injection molded material over its surface as shown in FIG. 2 following a secondary application of injection molded material over its surface.
Figures 4, 5:
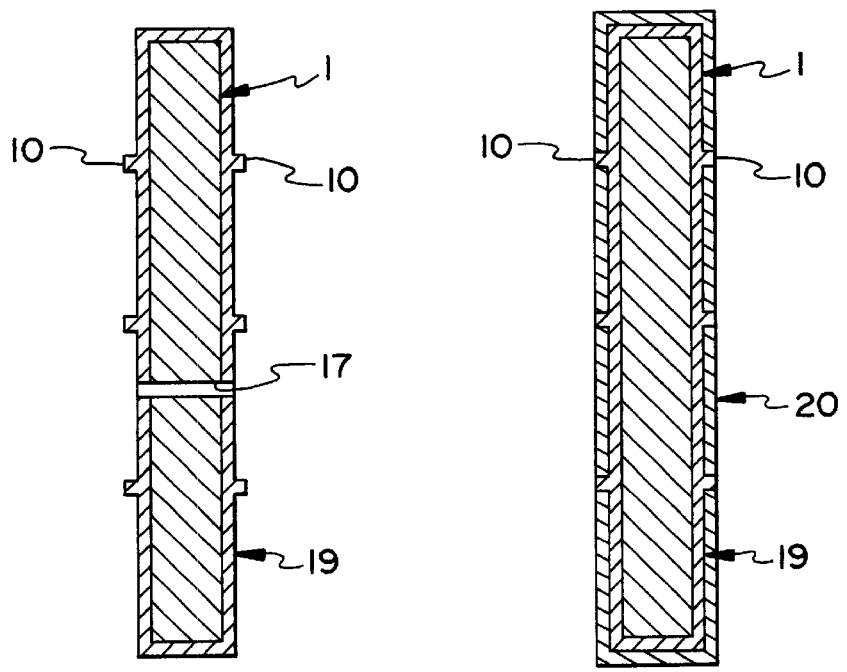
FIG. 4 is a cross sectional view taken along the line 4—4 of FIG. 2.
FIG. 5 is a cross sectional view taken along the line 5—5 of FIG. 3.

According to the above described method, the injection molding of material about the exterior surface of D-ring 1 when secured within first mold cavity 2 by pins 6 results in the formation of a D-ring with its surface encompassed with injection molded material except for the points of contact between pins 6 and the D-ring blank. These points of contact result in the formation of small openings 14 left within the injection molded covering. That is, when the D-ring having the injection molded material about its surface is removed from first mold cavity 2, there will be small portions upon either side of the D-ring that have not been covered with the injection molded material. In the preferred embodiment the exterior surface of the product at that point will also contain a plurality of outwardly extending protrusions that are generally arranged in pairs on opposite sides of the product (see FIGS. 2 and 4). The method of injection molding material about the surface of an object as described above comprises the first stage of an overall two stage process. The second stage of the process will now be described.

Following at least partial solidification of the injection molded material about the surface of the D-ring blank as described above, the object is removed from first mold 3 and positioned within the cavity 11 of a second mold 12 (see FIG. 7). Since additional material is to be injection molded about the surface of the D-ring it will be appreciated that cavity 11 of mold 12 will necessarily be larger than cavity 2 of first mold 3. The D-ring is secured and positioned within second mold cavity 11 through engagement of the interior surface 13 of the mold cavity with outwardly extending protrusions 10. That is, through compressing the mold against outwardly extending protrusions 10, the D-ring is effectively held in position within mold cavity 11 and stabilized for purposes of injection molding additional material about its exterior surface. At this point, with the object securely held within second mold cavity 11, additional material 20 may be injection molded about the surface of the object to completely encompass the object's surface except for the points of contact between outwardly extending protrusions of 10 and the interior surface 13 of second mold cavity 11. The additional material injection molded about the surface of the object will also fill and completely encompass openings 14 left in the first injection molded material by reason of contact of pins 6 with D-ring 1.

When material is to be injection molded over an object that is relatively planar (such as D-ring 1) the formation of outwardly extending protrusions 10 that are approximately of an equal length will result in a relatively even set-off of the object from the interior walls of second mold 12, thereby ensuring a relatively even coverage of the additional injection molded material about the surface of the object. However, where desired for particular applications, protrusions 10 may be formed such that they have varying lengths across the surface of the object. In that case a corresponding modification of the profile of the interior surface 13 of second mold 12 will also be required. Where protrusions 10 are of different lengths and the interior surface 13 of the second mold cavity has other than a plain constant profile, there will be provided the ability to form ridges or an increased or decreased thickness of the additional injection molded material at desired locations. For example, in the case of D-ring 1 it may be desired to form a ridge 15 of increased thickness of the additional injection molded material about an opening 16 in the D-ring to enhance the wear characteristics of the material about the opening.

In a further embodiment of the invention, the interior surface 13 of second mold 12 may include a plurality of indentations corresponding to the size and position of outwardly extending protrusions 10 about the surface of the D-ring. The outwardly extending protrusions that are formed upon the surface of the D-ring may then be received within the indentations in the surface of the mold cavity to help position and secure the D-ring within the mold cavity.

In yet a further aspect of the present invention, to help provide additional stability to the object when received within first mold cavity 2 the object may include one or more holes 17 therethrough. In the case of D-ring 1 there are preferably two holes passing through the D-ring blank from one side to the other, spaced apart from one another along the surface of the ring. A pair of posts 18, formed upon the surface of first mold 3, may then be received through holes 17 when D-ring 1 is held within first mold cavity 2. It will thus be appreciated that the receipt of posts 18 through holes 17 will enhance the stability of the D-ring and prevent movement of the D-ring within first mold cavity 2 in a direction generally parallel to its longitudinal axis. That is, posts 18 and holes 17 tend to provide stability to the D-ring in a direction generally perpendicular to the stability provided through the contact of pins 6 with the outer surface 5 of the D-ring. The combined function of pins 6 and posts 18 thus securely hold the D-ring within the mold cavity and prevent deflection or movement in any direction while pressurized injection molded material is delivered to the mold cavity. Where posts 18 are utilized within first mold cavity 2 the second stage of injection molding additional material about the surface of the D-ring within second mold 12 will include filling holes 17 with the additional injection molded material.

Depending upon the end use of D-ring 1, or such other object over which injection molded material is applied, the composition of the two injection molded materials may be the same or different. For example, the first material that is injection molded when the object is received within first mold 3 may be somewhat tougher and more abrasion resistant than the second injection molded material. Similarly, the first injection molded material may have enhanced corrosion resistance properties over and above the second injection molded material so as to provide a higher level of corrosion prevention immediately adjacent the underlying object. For other specific applications the first and/or second injection molded materials may be comprised of di-electric insulating compounds. For example, it has been found that BASF Ultramid A3K nylon 66 has exhibited sufficient injection molding characteristics to allow it to be injection molded over the surface of a metallic D-ring blank to provide a relatively tough, abrasion resistant di-electric coating. To further enhance the physical characteristics of the completed product an ultraviolet retardant additive may be incorporated within the injection molded material to help prevent or limit degradation through exposure to ultraviolet radiation.

Finally, the injection molded material applied over the surface of D-ring 1 when within first mold 3 may also be of a different colour than the injection molded material applied when the object is within second mold 12. In this fashion, should the additional or second injection molded material become worn, removed or dislodged the colour of the first injection molded material will have a tendency to show through, presenting a visual wear indicator to notify a user that the outer covering has been compromised.

It is to be understood that what has been described are the preferred embodiments of the invention and that it may be possible to make variations to these embodiments while staying within the broad scope of the invention. Some of these variations have been discussed while others will be readily apparent to those skilled in the art.

What is claimed is:

1. A method of injection molding material around the surface of an object, the method comprising the steps of:
   (i) positioning the object within the cavity of a first mold, said object held within said mold cavity through the use of a plurality of clamping mechanisms that contact the surface of said object;
   (ii) injection molding a first material about the surface of said object, said first material encompassing the surface of said object except for the points of contact between said clamping mechanisms and said object, said step of injection molding said first material about the surface of said object including the formation of a plurality of protrusions extending outwardly from the surface of said object, said protrusions formed of said injection molded first material;
   (iii) allowing said injection molded first material to at least partially solidify about the surface of said object;
   (iv) removing said object with said injection molded first material about its surface from said first mold cavity and positioning said object within the cavity of a second mold;
   (v) securing said object within said second mold cavity through engagement of said plurality of outwardly extending protrusions with said second mold; and
   (vi) injection molding a second material about the surface of said object, said second material encompassing said object and said at least partially solidified first material except for points of contact between said outwardly extending protrusions and said second mold.

2. The method as claimed in claim 1 wherein said first clamping mechanisms comprise a plurality of rigid pins, said pins extendable to a position wherein they contact the surface of said object and retractable to a position wherein they are free from contact with the surface of said object, when said pins are extended and in contact with the surface of said object said pins assisting in stabilizing the position of said object within said first mold cavity while said first material is injection molded about the surface of said object.

3. The method as claimed in claim 1 wherein said first clamping mechanisms comprise a plurality of rigid pins fixed to the interior surface of said first mold such that when said object is positioned within said first mold cavity, said pins contact the surface of said object to assist in stabilizing the position of said object within said first mold cavity while said first material is injection molded about the surface of said object.

4. The method as claimed in claim 3 wherein said pins contact said surface of said object at approximate right angles.

5. The method as claimed in claim 1 wherein said object includes one or more holes therethrough, said one or more holes each receiving a post therethrough when said object is held within said first mold cavity, said posts being secured to said first mold and assisting in stabilizing said object within said first mold cavity in a direction approximately perpendicular to said clamping mechanisms.

6. The method as claimed in claim 3 wherein said object includes one or more holes therethrough, said one or more holes each receiving a post therethrough when said object is held within said first mold cavity, said posts being secured to said first mold and assisting and stabilizing said object within said first mold cavity.

7. The method as claimed in claim 6 wherein said step of injection molding said second material about the surface of said object includes filling said one or more holes extending through said object with said second material.

8. The method as claimed in claim 1 wherein said step of securing said object having said first injection molded material about its surface within said second mold cavity includes positioning said outwardly extending protrusions within correspondingly configured indentations upon the interior surface of said second mold.

9. The method as claimed in claim 1 wherein said injection molded first material and said second material are of the same composition.

10. The method as claimed in claim 1 wherein said injection molded first material and said second material are of different compositions having different physical properties.

11. The method as claimed in claim 1 wherein said injection molded first material and said second material are of different colors such that said injection molded first material serves as a visual wear indicator in the event that said second material becomes worn, removed or dislodged from the surface of said object.

12. The method as claimed in claim 1 wherein said injection molded first material and said second material are di-electric insulating materials.

13. The method as claimed in claim 1 wherein said injection molded first material and said second material are comprised of a high-strength abrasion resistant nylon.

14. The method as claimed in claim 1 wherein said object is comprised of a metallic D-ring, said injection molded first material and said second material comprised of a di-electric insulating material.

15. The method as claimed in claim 1 wherein said step of injection molding said second material about the surface of said object includes the further step of forming ridges of said second injection molded material about openings through said object, said ridges comprising wear ridges to enhance the wear characteristics of said object.

* * * * *